Figure 1:
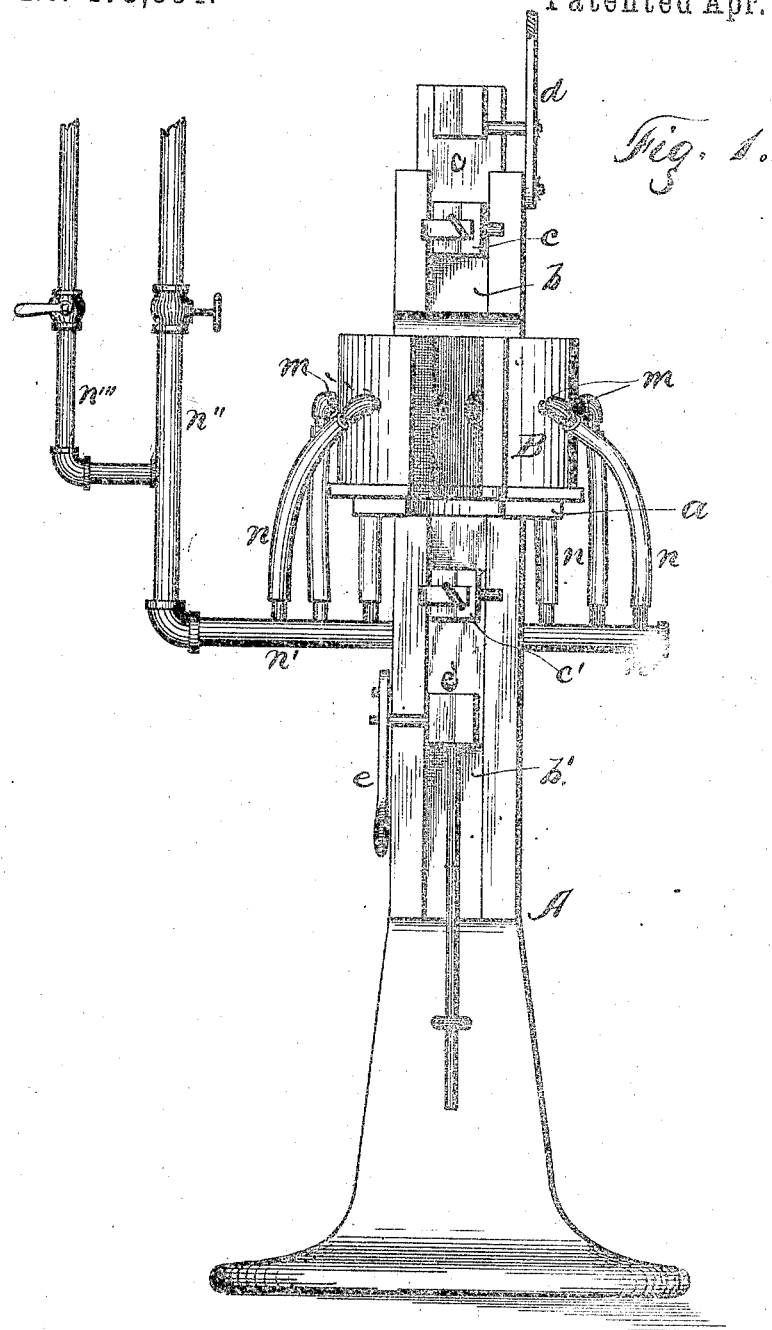

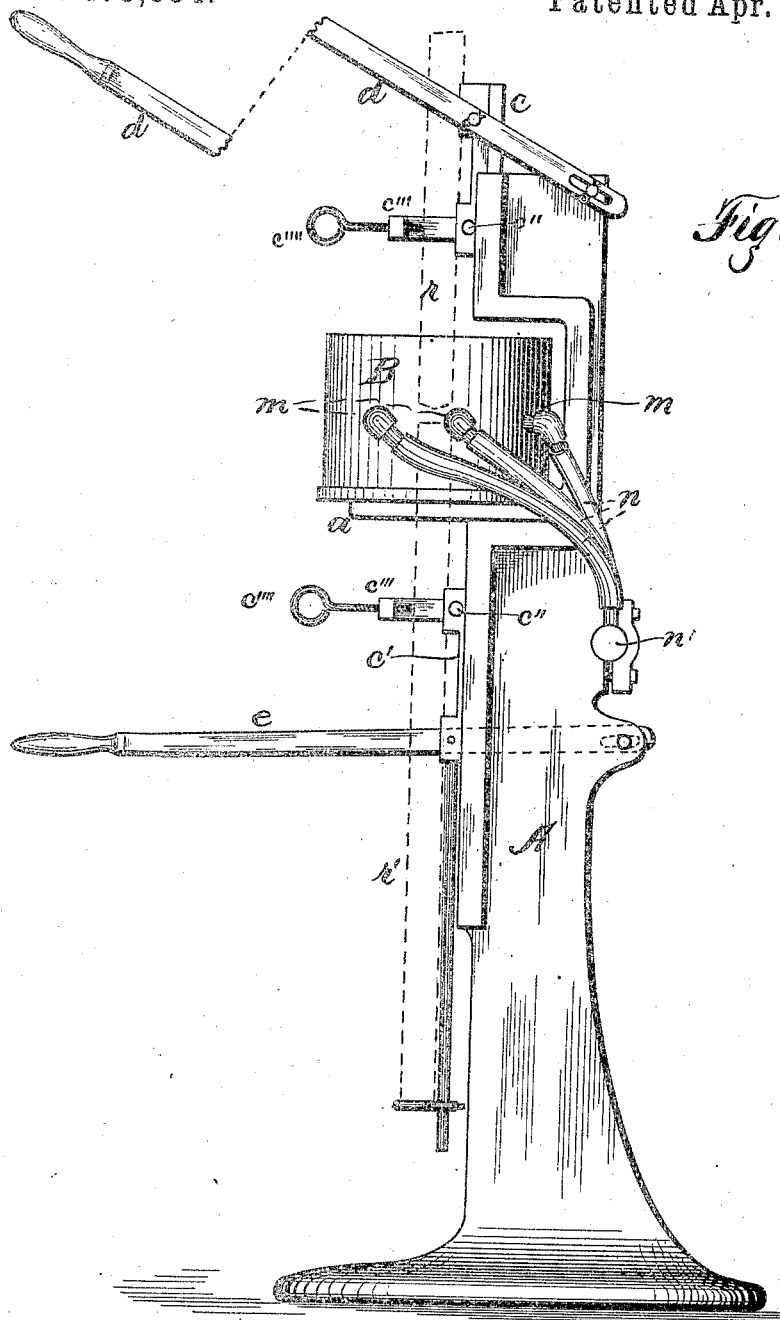

(No Model.) 3 Sheets—Sheet 3.
C. E. LIPE & J. A. PROSS.
PROCESS OF AND APPARATUS FOR WELDING METALS.
No. 473,834. Patented Apr. 26, 1892.
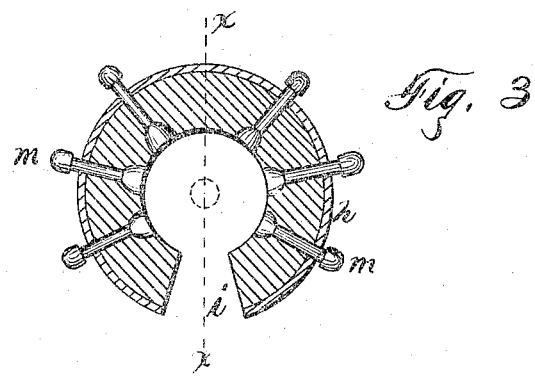
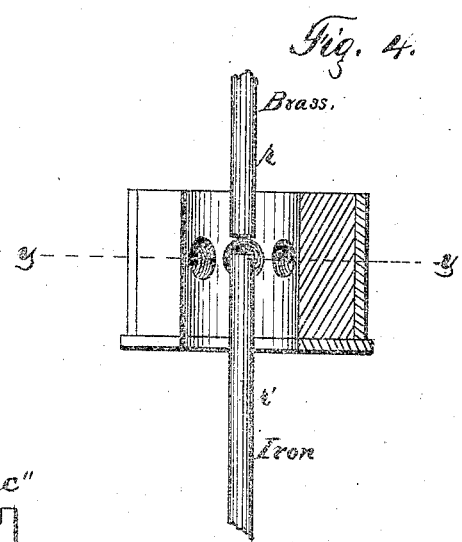
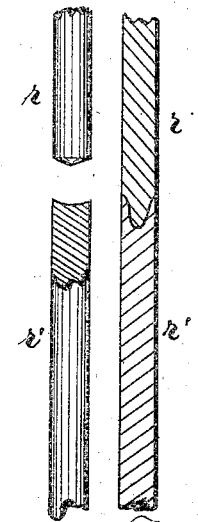
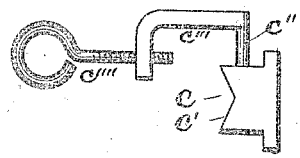
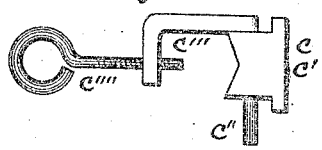
WITNESSES:     INVENTORS
           Charles E. Lipe
           John A. Pross
           by Smith & Denison
           their ATTORNEYS.

UNITED STATES PATENT OFFICE.

CHARLES E. LIPE AND JOHN A. PROSS, OF SYRACUSE, NEW YORK.

PROCESS OF AND APPARATUS FOR WELDING METALS.

SPECIFICATION forming part of Letters Patent No. 473,884, dated April 26, 1892.

Application filed April 20, 1891. Serial No. 389,579. (No model.)

*To all whom it may concern:*

Be it known that we, CHARLES E. LIPE and JOHN A. PROSS, of Syracuse, in the county of Onondaga, in the State of New York, have invented new and useful Improvements in Processes of and Apparatus for Welding Metals, of which the following, taken in connection with the accompanying drawings, is a full, clear, and exact description.

Our invention relates to furnaces and apparatus for heating and welding metals, and particularly to that class which are adapted to heat and weld together metals of different kinds and fusing at different temperatures.

Our object is to produce a furnace and apparatus by which we can heat and weld two pieces of different kinds of metal—such as iron or steel and brass—or two pieces of metal, one magnetic and the other non-magnetic, to produce a bar valuable in electrical apparatus, as well as to simply weld two pieces of analogous metal, such furnace or apparatus consisting of a tubular furnace proper open, with a removable wedge-section to one side to permit vision of the ends of the bars of metal being welded, and also to permit their insertion into the furnace and removal after welding, said furnace being provided with multiple heating-burners adapted to operate upon the principle of the Bunsen burners, inserted through its walls and connected to a source of supply for a blast of air and to a source of supply for gas, said furnace being supported upon a suitable standard, said standard being provided with vertical ways, slides in the ways, grips upon the slides, and levers connected to the slides, by which the slides are moved toward each other to bring the heated ends of the bars together at the proper time to make the weld, said gas and air pipes uniting before reaching the furnace, and provided with means whereby we can shut off the air for a gas flame only, by which we can unite the gas and air to produce greater heat, and by which we can subject the welded metal to a blast of air alone for cooling it quickly, and we can also use petroleum or other fuel, and when two bars of different fusing temperatures are to be welded we can heat them unequally to bring them both to a welding heat at the same time.

Our invention consists in the several novel features of construction and operation hereinafter described, and which are specifically set forth in the claims hereunto annexed.

It is constructed as follows, reference being had to the accompanying drawings, in which—

Figure 1 is a front elevation of our apparatus ready for use. Fig. 2 is a side elevation of the same, showing by the vertical dotted lines two bars of metal secured in position ready for heating. Fig. 3 is a horizontal transverse section of the furnace on line $y\ y$, Fig. 4, showing the burners in top plan. Fig. 4 is a vertical section of the furnace on line $x\ x$, Fig. 3, showing two pieces of metal therein with their ends contiguous ready for welding. Fig. 5 is a top plan view of one of our grips for holding the metallic bars. Fig. 6 is a like view of the same, showing the arm pushed to one side. Fig. 7 is an enlarged sectional elevation of two metallic bars, showing their respective concavity and convexity upon their adjoining ends when ready to be heated and welded together. Fig. 8 is a vertical section of a bar, showing a deep cup-shaped weld between the two pieces.

A is the upright frame, provided with a table $a$, substantially as shown, with a vertical way $b$ in front and above the table and a vertical way $b'$ below the table, both ways being in vertical alignment and each way having a slide $c\ c'$, mounted and movable vertically therein. Each slide is provided with a more or less V-shaped jaw, is bored transversely to receive the pin $c''$ upon the arm $c'''$, and $c''''$ is a set-screw through said arm. This arm can swing vertically upon said pin and can be pushed to one side or removed, as desired. A lever $d$ is pivotally mounted upon the frame and pivotally connected to the slide $c$, and a lever $e$ is in like manner mounted upon the frame and connected to the slide $c'$.

B is the furnace, mounted upon the table and consisting of a metallic shell or case $h$ and a tubular lining of fire-brick or analogous material, and $i$ is a vertical opening through the case and lining.

$m\ m$ are the burners, inserted radially and in substantially the same horizontal plane through the case and nearly through the lining, the inward ports in the lining being bell-mouthed. Each burner is provided on its outer end with means to permit us to couple one of the pipes $n$ thereto. These pipes $n$ are connected to the header $n'$ and $n''$ in the air-blast pipe, having a stop-cock, as shown, and coupled onto the header, and $n'''$ is the gas-supply pipe connected to the air-pipe adjacent to the header, and it is also provided with a stop-cock, substantially as shown.

When the metallic bars $r\ r'$ are secured in the slides, their inner ends are contiguous and central to the furnace and are both in the same vertical plane. The end of the lower bar is concaved more or less and the end of the upper bar is made convex to a like degree, substantially as shown. For illustration of the utility of this apparatus we will call the upper one "brass" and the lower one "iron."

The air-pipe is connected to any ordinary blast-producing apparatus (not shown) and the gas-pipe is connected to a source of gas supply, (not shown,) the connection of the two pipes being of such a nature that the suction of the air will draw in the gas in proper proportions. Then to start the furnace we let on the gas, light it in the furnace, and then let on the air-blast until we obtain the proper admixture of air and gas, thereby producing the most intense heat. As the burners are all radial and the bars are central to the furnace, the blast flames from the multiple burners are substantially horizontal. The upper bar of brass, for illustration, is secured in the grip, and by the lever its lower end is adjusted so as to be above the direct line of the blast or flame, for the reason that we wish to heat this bar less than the lower one. The lower bar of iron or steel, for illustration, is secured in its grip and by its lever is adjusted so that its upper end is in the direct line of the blast or flame, which is the hottest point. Then both bars are heated simultaneously, but in unequal degrees. When the end of the lower bar has reached the welding-point and the upper one is at or approaching the fusing-point of that metal, we then bring the ends together and the hotter lower bar will fuse the end of the upper bar, and thus fuse and weld the bars together, such pressure being exerted upon the bars through the levers as is necessary. The temperature of the upper bar is regulated by its distance above the direct line of blast. As soon as this is complete, we shut off the gas and expose the bars to the blast of air, which quickly cools them, when the welded bar is removed. When the heated brass point enters the concavity of the iron, the ebullition expels all of the scale and oxidation, so that the weld is perfect. The concavity also serves to hold the flux when a flux is used.

It will be seen that the work-holders are independent of each other and that either bar can at-will be brought under the action of the strongest heat by lifting it or lowering it, and the operator can raise the upper bar or lower the other for inspection, and he can also "feel" the giving away of the bars as pressed together in making the weld, and thus determine when it is completed.

It will be seen that we can also make a deep cup-shaped weld, which is very desirable where the welded rod is exposed to longitudinal strain, and also when we desire to increase the amount of magnetic metal in a bar of given length and diameter.

By this furnace and appliances we have succeeded at a nominal expense in welding large bars of different metals fusing at different temperatures, which has heretofore only been accomplished by electricity at great expense for machinery, engines, and dynamos and with great danger to the operators.

What we claim as our invention, and desire to secure by Letters Patent, is—

1. A welding-machine consisting of a vertical standard, a table supported thereby, ways above and below the table, slides in the ways, grips carried by the slides, a furnace mounted upon said table, and multiple burners opening therein and connected to the sources of air and gas supply, in combination, as set forth.

2. The combination, with the vertical standard and the grip-carrying slides movable vertically therein, of a tubular furnace open on one side, multiple ports opening into the furnace, radial tubes connected to said ports, and means for supplying air and gas to said tubes, as set forth.

3. In a welding-machine, a heating-furnace comprising a body open at both ends and in one side and multiple burners inserted radially through the body, and piping connecting them to separate sources of supply of air and gas, and means to regulate the flow of either to the burners, in combination, as set forth.

4. The process of welding consisting in simultaneously heating to unequal degrees in a furnace bars of metal fusing at different temperatures by adjusting them independently with reference to the point of highest temperature therein and forcing them together when the bars reach their respective welding heat without removing them from the furnace.

In witness whereof we have hereunto set our hands this 2d day of April, 1891.

C. E. LIPE.
JOHN A. PROSS.

In presence of—
HOWARD P. DENISON,
C. W. SMITH.